UNITED STATES PATENT OFFICE.

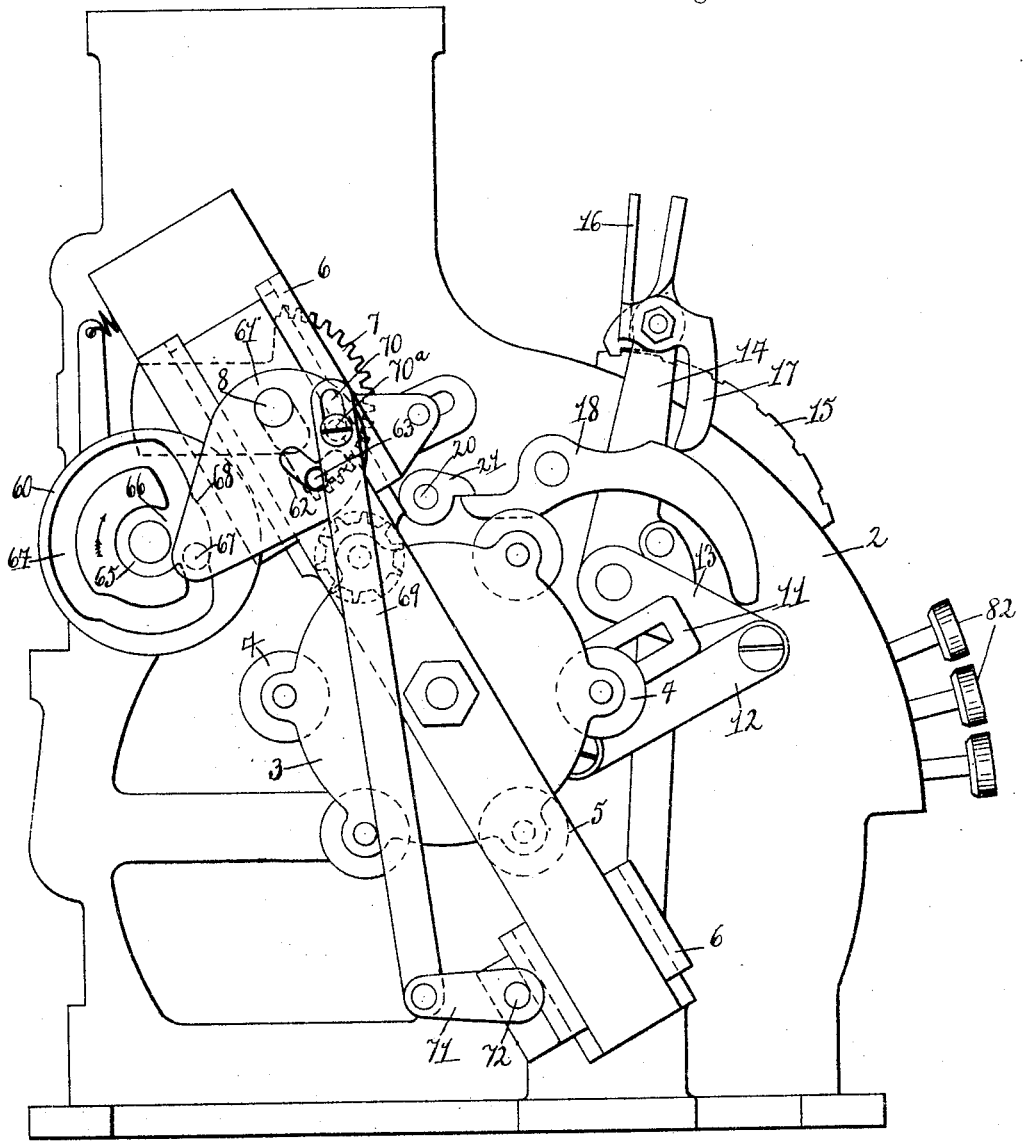

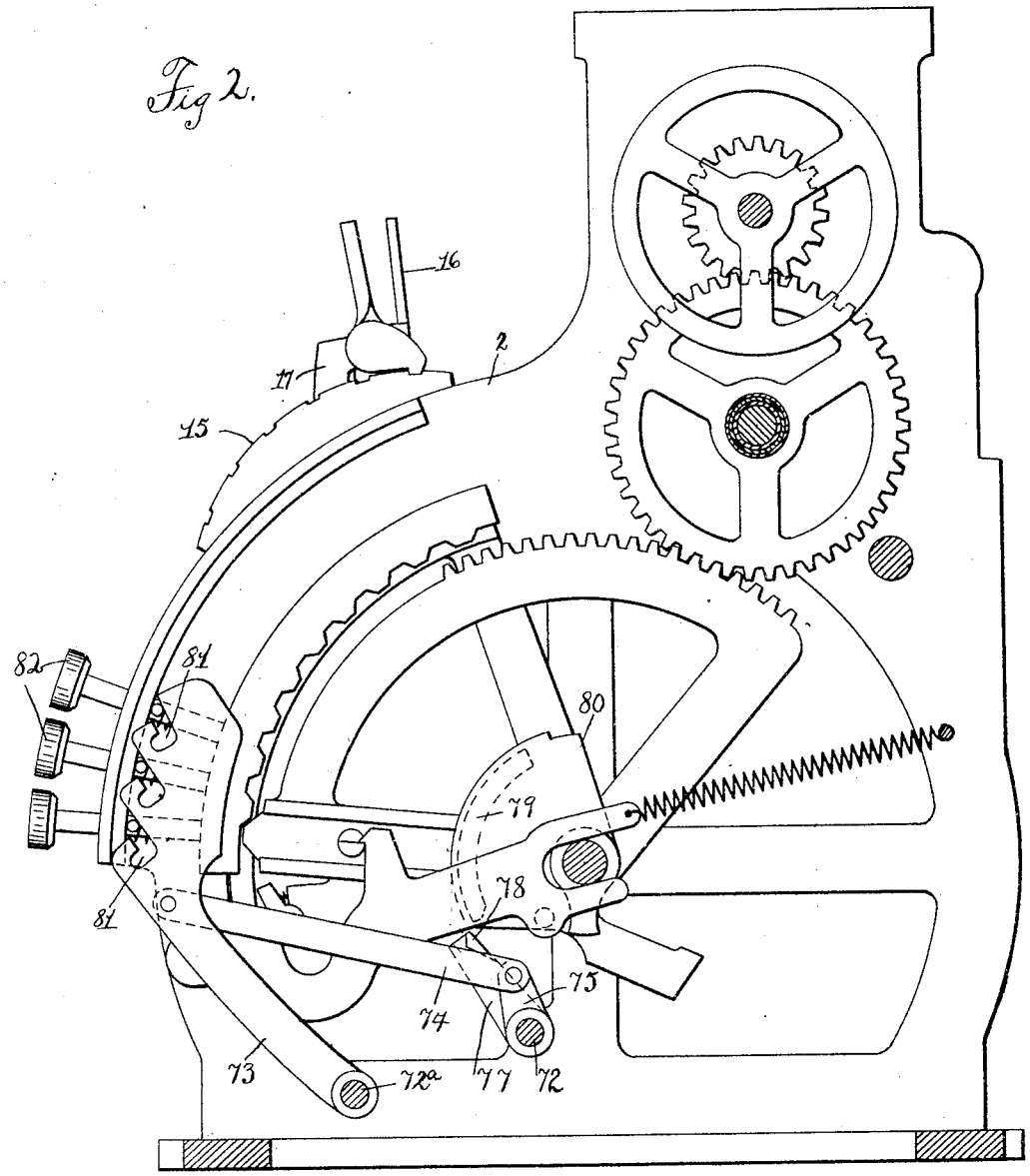

ROBERT H. RIDDLE, OF DAYTON, OHIO, ASSIGNOR TO NATIONAL CASH REGISTER COMPANY, OF JERSEY CITY, NEW JERSEY, A CORPORATION OF NEW JERSEY.

CASH-REGISTER.

No. 803,714.     Specification of Letters Patent.     Patented Nov. 7, 1905.

Application filed March 31, 1904. Serial No. 200,916.

*To all whom it may concern:*

Be it known that I, ROBERT H. RIDDLE, a citizen of the United States, residing at Dayton, in the county of Montgomery and State of Ohio, have invented certain new and useful Improvements in Cash-Registers, of which I declare the following to be a full, clear, and exact description.

The present invention relates to the type of cash-register shown in Patent No. 703,639, issued July 1, 1902, on the inventions of T. Carroll; and the object in the present case is to provide means for preventing the selected counter of a multiple-counter series from being moved into gear with the differential driving mechanism of the machine when certain special transactions are to be made, such as those commonly designated "Chge.," "Paid out," and "Recd. on account." It is not proposed by the present invention to immediately disable the connections by the pressing in of a special key, but to merely set certain parts so that in the subsequent operation of the machine said connections will be disabled. In this particular the invention differs from that set forth in the copending application of Thomas Carroll, Serial No. 200,422, filed March 28, 1904, and it is to be stated at the outset that any patentable features which are common to this and said Carroll application form the subject of claims in the latter.

With the above-stated object in view the invention consists in certain novel features of construction and combinations of parts, the essential elements of which are set forth in the appended claims and a preferred form of embodiment of which is hereinafter specifically described with reference to the drawings which accompany and form part of this specification.

Of said drawings, Figure 1 represents a machine of the above-designated type in side elevation with some parts omitted, the view being as much in outline as consistent with good illustration with the object of bringing out as clearly as possible the salient features of the invention. Fig. 2 represents a cross-sectional elevation on a line from front to rear of the machine looking in the reverse direction as compared with Fig. 1.

Reference-numeral 2 designates the main framework of the machine; 3, a reel supporting a series of counters 4, said reel being journaled in a sliding support or frame 5, fitted to guides 6 on the main frame, and numeral 7 designates one of a series of toothed segments combined with the differential driving mechanism of the machine so as to move in accordance with the amounts set up by manipulation of the amount-keys. A sliding rack 11 gears with a pinion on the reel 3, as shown in said prior patent, and a link 12 couples said rack to one arm 13 of a bell-crank lever, the other arm 14 of which extends along a notched plate 15 and constitutes a handle by which to rotate the reel and bring one or another of the counters in position for coöperating with the segments 7. Said handle 14 carries a latch 16 for engagement with the notches of the plate 15, and the latch has a tailpiece 17 engaging the long arm of a lever 18, whose short arm underlies the shoulder of a collar 21 on a shaft 20, carrying at the other end of the machine a lock, as shown in said Carroll patent.

The raising and lowering of the sliding support 5 for the purpose of engaging a counter with and disengaging it from the segments 7 is brought about through the medium of a disk 60, secured to one of the rotation-shafts of the machine, and a lever 61, pivoted upon the shaft 8, about which the segments 7 center, and having an angular slot 62, into which projects a roller-equipped pin 63, carried by the sliding support 5. The raising and lowering of the slide is brought about by the side walls of the upwardly-extending portion of said angular slot coming against the roller 63 with a camming effect when the lever 61 is vibrated. The other part of said angular slot 62 is provided for the purpose of permitting an adjustment of said lever 61, whereby coöperative relation between the lever and the disk 60 is controlled. Said disk is formed as a box-cam by having in its side an irregular groove 64; but it is also formed with an inner concentric groove 65, and the two grooves merge into each other at 66. The lever 61 is provided with a pin 67, which projects into the grooved side of the disk 60. Normally the pin 67 occupies a portion of the cam-groove 64 just at the intersection of the same with the angular groove 65 and outside the circle of the latter. It should be stated that a portion of the outer wall of the cam-groove 64 at 68 is concentric with the groove 65. Now in the normal adjustment of the parts, as above indicated, upon rotation of the disk 60 in the direction of the arrow (see Fig. 1) no movement of the lever 61 will immediately result, as the concentric part 68 of the cam-groove will be traversing the pin 67, but in the continued rotation of said disk the angular part of the cam-groove will traverse the pin, with the result that the lever 61 will be lowered and the sliding support for the counters consequently raised. Now it will be seen that if the lever 61 is rocked about its pivot so as to swing the pin 67 into the circle of the groove 65 then upon the rotation of the disk 60 no movement of the lever 61 will ensue, because only the concentric groove 65 will be traversing the pin 67. Hence in order to prevent the selected counter from coming into gear with the segments 7 it is only necessary to provide for the shifting of the lever 61. The lower part of the angular slot 62 in said lever provides for this adjustment of the lever, and to bring it about devices are employed, as shown in Fig. 2, quite similar to those disclosed in Patent No. 690,554, issued January 7, 1902, to F. H. Bickford. Before leaving Fig. 1, however, certain new parts, which coöperate with these Bickford devices, should be described.

Numeral 69 in Fig. 1 designates a link which has in its upper end an elongated slot 70, embracing a headed screw 70ª, secured in the lever 61, and at its lower end is coupled to an arm 71, secured to a shaft 72.

Now, turning to Fig. 2, a stub-shaft 72ª carries affixed to it an arm 73, coupled by a link 74 to an arm 75, secured to the aforesaid shaft 72, which carries another arm 77, having a cam-nose 78, adapted to be operated upon by a flange 79 on one of the operating-segments 80 of the machine. The upper part of the arm 73 is in the form of a plate, having a series of inclined recesses 81, and there is a short bank of special keys 82 with laterally-projecting pins occupying said inclined recesses. The pressing in of any one of these keys produces a rearward movement of the arm 73, and consequently of the arm 77, so that the cam-nose of the latter is brought into the path of the beveled end of the flange 79, and in the subsequent operation of the machine this arm 77 will be further moved rearwardly, and consequently the shaft 72 will be rocked to a greater extent than by the simple pushing in of the key 82. However, this pushing in of one of these keys rocks the said shaft 72 sufficiently to bring the upper end of the slot 70 in the link 69 down upon the headed screw 70ª of the lever 61. Hence when said shaft is further rocked in the operation of the machine said lever 61 will be moved rearwardly. Thus it results that the operation of one of the special keys disables the connections for bringing the selected counter into gear with the differential driving mechanism of the machine, for the rearward movement of the lever 61 takes its pin 67 into the concentric groove 65, and so no upward movement of the counter-support 5 can ensue, and the pinions of the selected counter remain out of gear with the segments 7.

It will now be seen that the construction described is well adapted to carry out the object primarily stated; but at the same time it is to be understood that the invention may be embodied in other forms, the same not being limited to the particular form of construction here chosen for the purposes of illustration.

Having thus described my invention, what I claim as new, and desire to secure by Letters Patent, is—

1. In a machine of the character described, the combination with an operating mechanism, a plurality of counters adapted to be brought separately into operative relation thereto, a movable support for said counters operatively connected with the said operating mechanism, and means for setting any one of the counters for coöperation with the operating mechanism; of means for disabling the counter-support operating connections at will to prevent the set counter from moving into coöperative relation with the operating mechanism, said means comprising manipulative devices for setting the parts, and also being so constructed that the actual displacement in the connections ensues as an accompaniment to an operation of the machine.

2. In a machine of the character described, the combination with a driving mechanism differentially operable according to the amount set up, a plurality of counters designed to separately coöperate with said mechanism, a carrier for said counters adjustable to position any one of them for coöperation with the driving mechanism, a support for said carrier movable to take the set counter into and out of coöperative relation with the driving mechanism, and connections between said support and the latter mechanism for moving it back and forth in each operation of the machine; of means for disabling said connections at will, said means comprising manipulative devices for setting the parts, and also being so constructed that the actual displacement in the connections ensues as an accompaniment to an operation of the machine.

3. In a machine of the character described, the combination with a driving mechanism differentially operable according to the amount set up, a plurality of counters designed to separately coöperate with said mechanism, a carrier for said counters adjustable to position any one of them for coöperation with the driving mechanism, a support for said carrier movable to take the set counter into and out of coöperative relation with the driving mechanism, and connections between said support and the latter mechanism for moving it back and forth in each operation of the machine, said connections comprising a cam compounded with the driving mechanism and a vibratory member coöperating with said cam and with said support and adjustable into and out of coöperative relation with the former; of means, including manipulative devices, for destroying the coöperative relation between the said vibratory member and its cam at will.

4. In a machine of the character described, the combination with a driving mechanism differentially operable according to the amount set up, a plurality of counters designed to separately coöperate with said mechanism, a carrier for said counters adjustable to position any one of them for coöperation with the driving mechanism, a support for said carrier movable to take the set counter into and out of coöperative relation with the driving mechanism, and connections between said support and the latter mechanism for moving it back and forth in each operation of the machine, said connections comprising a rotary cam compounded with the driving mechanism and having effective and ineffective runways, and a lever having a projection engaging the cam and a slot-and-pin connection with the counter-support; of means for shifting the said lever out of coöperative relation with the effective runway of the cam substantially as and for the purpose described.

5. In a machine of the character described, the combination with a driving mechanism differentially operable according to the amount set up, a plurality of counters designed to separately coöperate with said mechanism, a carrier for said counters adjustable to position any one of them for coöperation with the driving mechanism, a support for said carrier movable to take the set counter into and out of coöperative relation with the driving mechanism, and connections between said support and the latter mechanism for moving it back and forth in each operation of the machine, said connections comprising a rotary disk having concentric and cam grooves merging into each other and a lever with a projection engaging the grooves and a slot-and-pin connection with the counter-support; of means for shifting said lever out of coöperative relation with the cam-groove, substantially as and for the purpose described.

6. In a machine of the character described, the combination with a driving mechanism differentially operable according to the amount set up, a plurality of counters designed to separately coöperate with said mechanism, a rotary carrier for said counters adjustable to position any one of them for coöperation with the driving mechanism, a sliding support for said carrier movable to take the set counter into and out of coöperative relation with the driving mechanism, and connections between said support and the latter mechanism for moving it back and forth in each operation of the machine, said connections comprising a rotary disk having concentric and cam grooves merging into each other and a lever with a projection engaging said grooves and an angular slot-and-pin connection with the sliding counter-support; of means for shifting said lever to throw its projection into the concentric groove of the rotary disk at will.

7. In a machine of the character described, the combination with a driving mechanism differentially operable according to the amount set up, a plurality of counters designed to separately coöperate with said mechanism, a rotary carrier for said counters adjustable to position any one of them for coöperation with the driving mechanism, a sliding support for said carrier movable to take the set counter into and out of coöperative relation with the driving mechanism, and connections between said support and the latter mechanism for moving it back and forth in each operation of the machine, said connections comprising a rotary disk having concentric and cam grooves merging into each other and a lever with a projection engaging said grooves and an angular slot-and-pin connection with the sliding counter-support; of means for shifting said lever to throw its projection into the concentric groove of the rotary disk at will, said means comprising a rock-shaft, a link cranked thereto and having a slot-and-pin connection with the said lever, manipulative devices for imparting an initial movement to said rock-shaft, and devices compounded with the driving mechanism for imparting a final movement to said shaft substantially as and for the purpose described.

8. In a cash-register the combination with a plurality of counters and actuating mechanism therefor, of means for predetermining which counter shall be operated, an operating mechanism, a throw-out device operated by said operating mechanism for preventing the operation of such predetermined counter, and a manipulative device for preparing for the operation of the throw-out device by the operating mechanism.

9. In a cash-register, the combination with a plurality of counters and an actuating mechanism therefor, of a movable support for said counters, means for moving any desired counter into engagement with its actuating mechanism, means for predetermining which counter shall thus be operated, an operating mechanism, a throw-out device operated by said operating mechanism for preventing the predetermined counter from being carried into engagement with its actuating mechanism, and a manipulative device for causing said operating mechanism to operate said throw-out device.

In testimony whereof I affix my signature in the presence of two witnesses.

ROBERT H. RIDDLE.

Witnesses:
 HERBERT C. WOOD,
 WM. O. HENDERSON.